United States Patent
Kamal

(10) Patent No.: US 10,404,464 B2
(45) Date of Patent: Sep. 3, 2019

(54) METHOD AND SYSTEM FOR SECURE FIDO DEVELOPMENT KIT WITH EMBEDDED HARDWARE

(71) Applicant: MasterCard International Incorporated, Purchase, NY (US)

(72) Inventor: Ashfaq Kamal, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 157 days.

(21) Appl. No.: 15/242,774

(22) Filed: Aug. 22, 2016

(65) Prior Publication Data

US 2018/0054312 A1 Feb. 22, 2018

(51) Int. Cl.
*H04L 9/32* (2006.01)

(52) U.S. Cl.
CPC ............ *H04L 9/3231* (2013.01); *H04L 9/321* (2013.01); *H04L 9/3247* (2013.01); *H04L 2209/56* (2013.01)

(58) Field of Classification Search
CPC .... H04L 9/3231; H04L 9/0841; H04L 9/3066
USPC ........................................................ 713/186
See application file for complete search history.

(56) References Cited

U.S. PATENT DOCUMENTS

| | | | |
|---|---|---|---|
| 9,330,513 B2* | 5/2016 | Soni | G06F 21/32 |
| 2003/0070079 A1* | 4/2003 | Cromer | G06F 21/32 |
| | | | 713/186 |
| 2003/0115475 A1 | 6/2003 | Russo et al. | |
| 2007/0106892 A1 | 5/2007 | Engberg | |
| 2007/0266427 A1 | 11/2007 | Kevenaar et al. | |
| 2009/0006855 A1 | 1/2009 | Tuyls et al. | |

(Continued)

FOREIGN PATENT DOCUMENTS

| | | |
|---|---|---|
| EP | 2 075 730 A1 | 7/2009 |
| WO | 2016/033499 A1 | 3/2016 |

OTHER PUBLICATIONS

Notification of Transmittal of the International Search Report and the Written Opinion of the International Searching Authority (Form PCT/ISA/220, PCT/ISA/210 and PCT/ISA237) dated Oct. 12, 2017, by the European Patent Office in corresponding International Application No. PCT/US2017/047727. (13 pages).

(Continued)

*Primary Examiner* — Mohammed Waliullah
(74) *Attorney, Agent, or Firm* — Buchanan Ingersoll & Rooney PC

(57) ABSTRACT

A method for registration of a biometric template in a computing device includes: storing, in a first memory of a computing device, a biometric module; receiving, by an input device of the computing device, biometric data of a user; generating, by the biometric module of the computing device, a template based on the biometric data; generating, by a generation module of the computing device, a cryptographic key pair comprised of a private key and a corresponding public key using an encryption algorithm; encrypting, by an encryption module of the computing device, the generated template using the private key; storing, in a second memory of the computing device, the private key, wherein the second memory is a trusted execution environment; and storing, in the computing device, the encrypted template.

20 Claims, 7 Drawing Sheets

(56) References Cited

U.S. PATENT DOCUMENTS

| | | | |
|---|---|---|---|
| 2009/0164797 A1* | 6/2009 | Kramer | G06F 21/32 |
| | | | 713/186 |
| 2009/0210722 A1 | 8/2009 | Russo | |
| 2010/0237991 A1* | 9/2010 | Prabhu | G06F 3/03547 |
| | | | 340/5.83 |
| 2010/0257369 A1* | 10/2010 | Baker | G06F 21/32 |
| | | | 713/186 |
| 2013/0318361 A1* | 11/2013 | Erickson | H04L 9/3257 |
| | | | 713/193 |
| 2014/0282945 A1* | 9/2014 | Smith | G06F 21/32 |
| | | | 726/6 |
| 2014/0365776 A1* | 12/2014 | Smets | H04L 9/0841 |
| | | | 713/171 |
| 2015/0016698 A1* | 1/2015 | Kerr | G06K 9/00093 |
| | | | 382/125 |
| 2015/0195278 A1* | 7/2015 | Plotkin | H04L 63/0861 |
| | | | 713/186 |
| 2015/0237046 A1* | 8/2015 | Chang | H04L 63/0861 |
| | | | 726/7 |
| 2015/0312041 A1* | 10/2015 | Choi | H04L 9/3231 |
| | | | 713/175 |
| 2015/0348026 A1* | 12/2015 | Roberts | G06Q 20/10 |
| | | | 705/71 |
| 2015/0350200 A1* | 12/2015 | Li | H04L 63/0861 |
| | | | 726/8 |
| 2016/0036826 A1 | 2/2016 | Pogorelik et al. | |
| 2016/0364559 A1* | 12/2016 | Bali | G06F 21/32 |
| 2018/0053005 A1 | 2/2018 | Kamal | |
| 2018/0054312 A1 | 2/2018 | Kamal | |

OTHER PUBLICATIONS

Co-pending U.S. Appl. No. 15/242,825, "Method and System for Secure Device Based Biometric Authentication Scheme," filed Aug. 22, 2016, naming Ashfaq Kamal.

Non-Final Office Action dated Feb. 21, 2019, by the U.S. Patent and Trademark Office in co-pending U.S. Appl. No. 15/242,825.

Office Action issued by the U.S. Patent and Trademark Office in the U.S. Appl. No. 15/424,285, dated Oct. 5, 2018, U.S. Patent and Trademark Office, Alexandria, VA (17 pages).

* cited by examiner

METHOD AND SYSTEM FOR SECURE FIDO DEVELOPMENT KIT WITH EMBEDDED HARDWARE

FIELD

The present disclosure relates to the registration of encrypted biometric templates in a computing device for use in device based biometric authentication, specifically the use of multiple application programs and memory sections in a computing device to accomplish Fast Identity Online (FIDO)-compliant biometric authentication locally on a computing device without the use of a dedicated FIDO application.

BACKGROUND

Over time, individuals have begun to use computing devices to assist in more and more of the activities in their daily lives. While computing devices were traditionally limited to data entry and manipulation and information gathering, advances in technology and increased accessibility have seen computing devices used for online bill payment, electronic wallets, accessing of sensitive records, vehicle registration, license renewal, exchange of documents, etc. Such activities typically require the individual to authenticate themselves, to ensure that the individual is who they purport to be, so that there is no unauthorized access to or usage of data.

In many cases, authentication involves no more than the use of a password previously registered by the individual. However, there are cases where a password may be insufficient. For example, an individual may want a higher level of security on payment credentials stored in their computing device due to the ability for a password to be compromised. In such instances, some computing devices are configured to capture biometrics of the user, which may be used in place of, or in addition to, a password or other form of authentication to provide for increased security.

However, in many cases it may be difficult, or in some instances even impossible, for an application program installed on the computing device to access the biometric data. In other cases, the program may have access to the biometric data, but may have to be specifically programmed to perform authentications using the biometric data, which may be difficult for application developers. To assist with the use of biometric data, the Fast IDentity Online (FIDO) Alliance was created, which provides specifications and standards for use of biometrics in user authentication on a computing device. However, such specifications require a computing device to have a FIDO-compliant application program already installed, and also require an active communication connection to an outside server, which receives and uses keys generated by the FIDO-compliant application in the authentication. In many cases, connectivity may be unavailable or inconsistent, and a computing device may not have a previously established FIDO-compliant application.

Thus, there is a need for a technical solution where FIDO-compliant biometric authentication can be performed locally on a computing device for usage by additional third party programs on the computing device.

SUMMARY

The present disclosure provides a description of systems and methods for registration of a biometric template in a computing device. A biometric template that is based on user-provided biometric data may be stored locally in a computing device that is encrypted via an encryption key stored a trusted execution environment of the computing device. As a result, the biometric template may be registered for usage in the computing device such that FIDO-compliant authentication may be performed locally, and with a high level of security due to the use of encryption and a trusted execution environment.

A method for registration of a biometric template in a computing device includes: storing, in a first memory of a computing device, a biometric module; receiving, by an input device of the computing device, biometric data of a user; generating, by the biometric module of the computing device, a template based on the biometric data; generating, by a generation module of the computing device, a cryptographic key pair comprised of a private key and a corresponding public key using an encryption algorithm; encrypting, by an encryption module of the computing device, the generated template using the private key; storing, in a second memory of the computing device, the private key, wherein the second memory is a trusted execution environment; and storing, in the computing device, the encrypted template.

A system for registration of a biometric template in a computing device includes: an input device of a computing device configured to receive biometric data of a user; a first memory of the computing device configured to store a biometric module configured to generate a template based on the biometric data; a generation module of the computing device configured to generate a cryptographic key pair comprised of a private key and a corresponding public key using an encryption algorithm; an encryption module of the computing device configured to encrypt the generated template using the private key; and a second memory of the computing device configured to store the private key, wherein the second memory is a trusted execution environment. The encrypted template may be stored in the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Device Based Authentication Using a Registered Biometric Template

Figure 1:
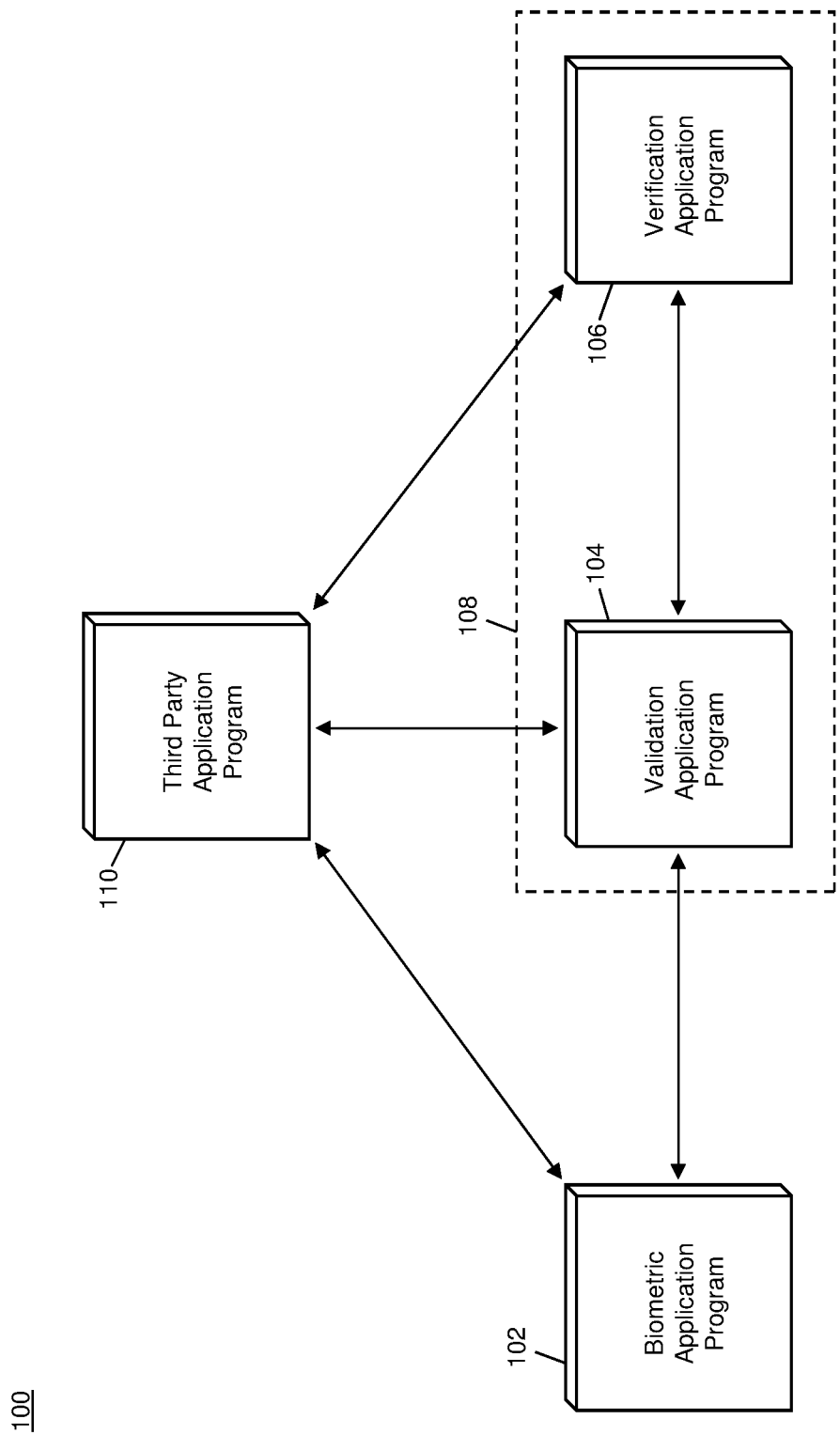
FIG. 1 is a block diagram illustrating a high level system architecture for a computing device configured to perform device based biometric authentication using a registered biometric template in accordance with exemplary embodiments.

FIG. 1 illustrates a system 100 for the registration of a biometric template and use thereof in performing device based authentication. In an exemplary embodiment, the components of the system 100 as illustrated in FIG. 1 may be included in a computing device, such as the computing device 200 illustrated in FIG. 2 and discussed in more detail below.

The system 100 may include a plurality of application programs. The application programs may be installed in memory of a computing device 200, as discussed in more detail below. The application programs may be executed by one or more processors of the computing device 200 as a result of the execution of program code associated therewith, and may be specifically configured to perform the functions discussed herein. The system 100 may include a biometric application program 102. The biometric application program 102 may be configured to receive and parse biometric data via one or more input devices of the computing device 200, such as a fingerprint scanner, retinal scanner, etc. Any suitable type of biometric data may be captured by the biometric application program 102 via input devices, such as fingerprint data, retinal scan data, voice data, facial scan data, etc. In some cases, the biometric application program 102 may be limited by the input devices of the computing device 200. In such cases, the biometric application program 102 may be configured to parse only the biometric data that may be obtained by the computing device 200. For instance, if the computing device 200 has a fingerprint reader but no optical image, the biometric application program 102 may parse fingerprint data but not retinal scan data.

The biometric application program 102 may also be configured to generate biometric templates. Biometric templates may be generated based on biometric data that is read from a user of the computing device 200. The template may be a hash value, cryptographic key, or other value that is generated that uses the biometric data as part of the generation thereof. For instance, the biometric data may be used as a seed in the generation of a cryptographic key, or a hashing algorithm may be applied to the biometric data to obtain a hash value for use as the biometric template. The biometric template may thus be a representation of the user's biometric data, but may be in a form different from the biometric data for protection thereof.

The computing device 200 may be configured to register a biometric template for a user thereof. As part of the registration process, the biometric application program 102 may generate the biometric template for the user, which may be encrypted prior to storage in the computing device 200. In some embodiments, the biometric application program 102 may be configured to perform the encryption. In other embodiments, the biometric application program 102 may electronically transmit the biometric template to a validation application program 104 using internal communication methods of the computing device 200. The validation application program 104 may be configured to encrypt the biometric template using an encryption key and a suitable encryption algorithm. In some embodiments, the encryption algorithm used by the validation application program 104 (e.g., or biometric application program 102, as applicable) may use the Elliptic Curve Diffie-Hellman protocol. The encrypted biometric template may then be stored locally in the computing device 200.

The encryption key used to encrypt the biometric template may be stored in a trusted execution environment (TEE) 108 of the computing device 200. A TEE 108 may be a secure area of storage in a computing device that provides a higher level of security than standard memory storage, and may utilize techniques in the securing thereof that will be apparent to persons having skill in the relevant art. TEE is a term of art that describes a variety of techniques and programmable and configured hardware configurations that form is a secure area of a main processor of a smart phone, or any connected device including tablets, PCs, set-top boxes and televisions, etc. It safeguards code and data loaded inside to be protected with respect to confidentiality and integrity. In some embodiments, the validation application program 104 may be stored in the TEE and may be a Trusted Application thereof. In such embodiments, the encryption key may be stored in memory associated with the validation application program 104 or may be otherwise inaccessible except by instruction of the validation application program 104.

In some embodiments, the encrypted biometric template may also be stored in the TEE 108. In other embodiments, the encrypted biometric template may be stored in other storage of the computing device 200, such as in standard memory. In some cases, the biometric application program 102 may also be stored in standard memory. In some such cases, the encrypted biometric template may be stored in memory associated with the biometric application program 102, and may be managed by the biometric application program 102.

Once a biometric template has been registered for a user, the user may be authenticated via their biometric template using the methods and systems discussed herein. For authentication, the user may again provide their biometric data for reading by a suitable input device of the computing device 200 and parsing by the biometric application program 102. The biometric application program 102 may generate a new biometric template based on the newly provided biometric data, and then provide the new biometric template to the validation application program. In some instances, the biometric application program 102 may also electronically transmit the encrypted biometric template to the validation application program 104.

In some embodiments, the biometric application program 102 may generate and sign a request for authentication, to request the authentication of the biometric data. In such embodiments, the request may be digitally signed using a private key generated by a suitable application program of the computing device 200. The validation application program 104 may validate the signature using a corresponding public key, which may be part of a key pair with the private key. The validation application program 104 may perform the validation where, if unsuccessful, the biometric application program 102 is informed of the failure. In such cases, the biometric application program 102 may prompt the user to provide biometric data again for another attempt at authentication.

If the validation is successful, the validation application program 104 may provide the new biometric template to a verification application program 106. The verification application program 106 may also be stored in the TEE 108, with which it may be a Trusted Application, and may be configured to verify matches of biometric templates. The verification application program 106 may receive the new biometric template from the validation application program 104 and may either identify the encrypted biometric template (e.g., stored in the standard memory or TEE 108) or be provided the encrypted biometric template by the validation application program 104 along with the new biometric template. The validation application program 104, after validation was performed, may release the encryption key to the verification application program 106. The verification application program 106 may use the encryption key to decrypt the encrypted biometric template, and then perform verification by comparing the two templates together to see if they match.

The verification application program 106 may provide the result of the verification back to the validation application program 104 to pass on to the biometric application program 102. The biometric application program 102 may then display the result of the verification, indicating successful or unsuccessful authentication. In some instances, the result may be passed to a third party application program 110 for which the authentication may be performed. For instance, the computing device 200 may include a third party application program 110 stored in the standard memory or TEE 108 for which biometric authentication may be desired. For example, the third party application program 110 may be an electronic wallet application program that requires biometric authentication prior to the use of payment credentials or may be a merchant application program that requires biometric authentication prior to initiating a payment transaction.

The third party application program 110 may submit a request for biometric authentication to the validation application program 104 or biometric application program 102. In some instances, the request may be digitally signed using an attestation key or other cryptographic key, which may be validated (e.g., by the validation application program 104). In some instances, the request may be signed and submitted in compliance with FIDO standards and specifications. The biometric authentication may then be performed using the methods discussed herein, where the result of the verification may be electronically transmitted to the third party application program 110 (e.g., by the validation application program 104 or biometric application program 102 in response to the request, or directly from the verification application program 106).

As a result, the third party application program 110 may receive the benefit of biometric authentication without the need for specialized programming or handling of biometric data. Instead, the third party application program 110 can simply request for authentication to be performed, where the other application programs may perform the authentication and provide a result (e.g., successful or unsuccessful) to the third party application program 110 for use thereof. Thus, third party application programs 110 in the computing device 200 may receive the benefit of authentication without being configured to perform any authentication themselves. In addition, the use of the TEE 108 and application programs stored therein, including the encryption of the biometric template and storage of the encryption key in the TEE 108, may enable the biometric authentication to be performed securely and locally in the computing device 200. Thus, no external connectivity is required for usage of the biometric authentication. In addition, the encryption of the biometric template and secured storage of the encryption key ensures that the biometric data of the user is unavailable and the template protected, such that only a Trusted Application, and no third party applications, may use or access the unencrypted template. Accordingly, the methods and systems discussed herein provide for FIDO-compliant biometric authentication that is performed locally in the computing device 200 and at a higher level of security than traditional authentication systems.

Computing Device

Figure 2:
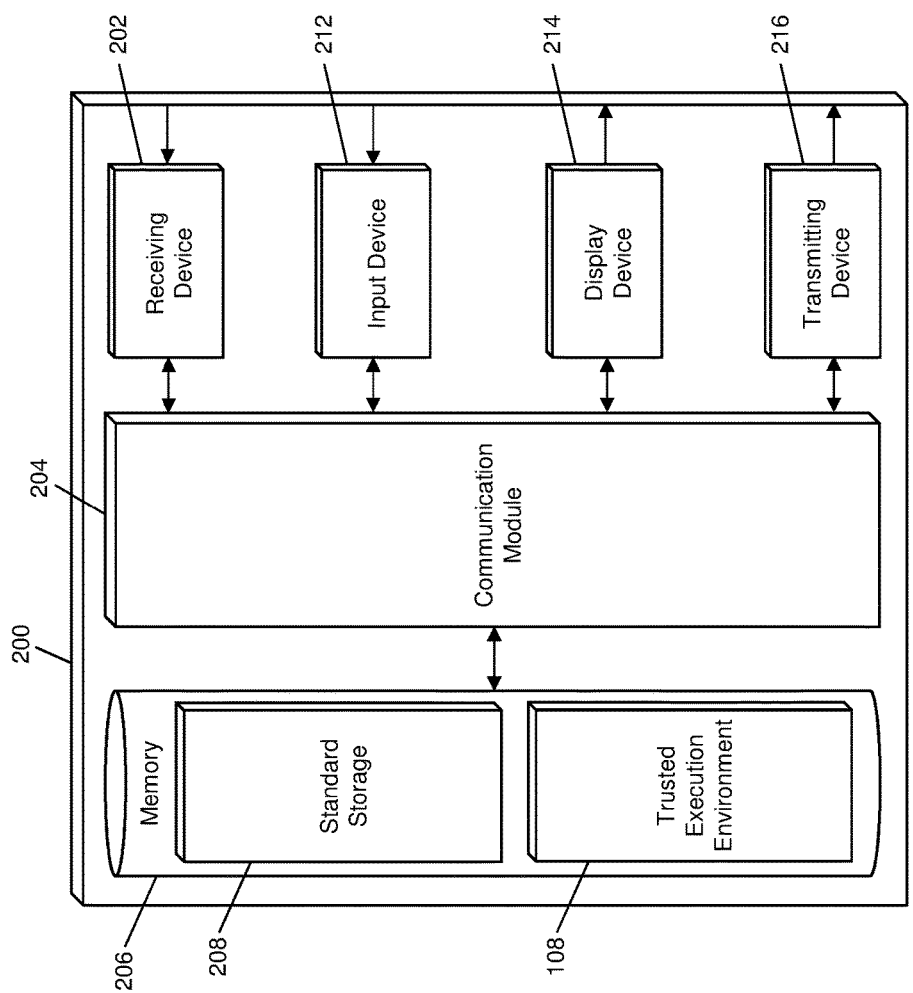
FIG. 2 is a block diagram illustrating a computing device for performing biometric authentication in conjunction with the architecture of the system of FIG. 1 in accordance with exemplary embodiments.

FIG. 2 illustrates an embodiment of a computing device 200 in the system 100. It will be apparent to persons having skill in the relevant art that the embodiment of the computing device 200 illustrated in FIG. 2 is provided as illustration only and may not be exhaustive to all possible configurations of the computing device 200 suitable for performing the functions as discussed herein. For example, the computer system 700 illustrated in FIG. 7 and discussed in more detail below may be a suitable configuration of the computing device 200.

The computing device 200 may include a receiving device 202. The receiving device 202 may be configured to receive data over one or more networks via one or more network protocols. In some instances, the receiving device 202 may be configured to receive data from other computing devices and entities via multiple networks, such as the Internet, a cellular communication network, local area network, wireless area network, radio frequency, etc. In some embodiments, the receiving device 202 may be comprised of multiple devices, such as different receiving devices for receiving data over different networks, such as a first receiving device for receiving data over a local area network and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein. In some cases, each application program stored in the computing device 200 and executed thereby may include receiving devices similar to the receiving device 202 for receiving data from other application programs and modules of the computing device 200 via internal communication methods for performing the functions discussed herein.

The computing device 200 may also include a communication module 204. The communication module 204 may be configured to transmit data between modules, engines, databases, memories, and other components of the computing device 200 for use in performing the functions discussed herein, such as transmitting data between the application programs stored in the various sections of memory in the computing device 200. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 200 and external components of the computing device 200, such as externally connected databases, display devices, input devices, etc. The computing device 200 may also include a processing device. The processing device may be configured to perform the functions of the computing device 200 discussed herein as will be apparent to persons having skill in the relevant art. In some embodiments, the processing device may include and/or be comprised of a plurality of engines and/or modules specially configured to perform one or more functions of the processing device. As used herein, the term "module" may be software executed on hardware or hardware particularly programmed to receive an input, perform one or more processes using the input, and provides an output. The input, output, and processes performed by various modules will be apparent to one skilled in the art based upon the present disclosure. The processing device may be configured to execute program code stored in the computing device 200 to run application programs of the computing device 200 for performing the functions discussed herein.

The computing device 200 may also include a memory 206. The memory 206 may be configured to store data for use by the computing device 200 in performing the functions discussed herein. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

In some embodiments, the memory 206 may be comprised of multiple sections, such as standard storage 208 and a trusted execution environment (TEE) 108. In some instances, the standard storage 208 and TEE 108 may each be included in separate memories 206 in the computing device 200. The standard storage 208 may utilize a traditional storage medium or mediums for the storage of data for the computing device 200, such as program code associated with the biometric application program 102 and third party application program 110. The standard storage 208 may be "standard" such that it is not a TEE and not subject to heightened security protocols and practices associated with TEEs as will be apparent to persons having skill in the relevant art. In some instances, the standard storage 208 may be used to store an encrypted biometric template following the registration process discussed herein.

The TEE 108 may be configured to store program code and data associated with Trusted Applications, including the validation application program 104 and verification application program 106. The TEE 108 may also be configured to store the encryption key used to encrypt the biometric template during registration, which may be stored in data directly associated with the validation application program 104. In an exemplary embodiment, the encryption key may not be accessed without authorization of the validation application program 104, which may release the encryption key for use by other application programs. In some embodiments, the TEE 108 may be used to store the encrypted biometric template generated as a result of the registration process discussed herein.

The computing device 200 may also include or be otherwise interfaced with one or more input devices 212. The input devices 212 may be internal to the computing device 200 or external to the computing device 200 and connected thereto via one or more connections (e.g., wired or wireless) for the transmission of data to and/or from. The input devices 212 may be configured to receive input from a user of the computing device 200, which may be provided to another module or engine of the processing server 102 (e.g., via the communication module 204) for processing accordingly. Input devices 212 may include any type of input device suitable for receiving input for the performing of the functions discussed herein, such as a keyboard, mouse, click wheel, scroll wheel, microphone, touch screen, track pad, camera, optical imager, fingerprint scanner, retinal scanner, etc. The input device 212 may be configured to, for example, receive biometric data read from a user, which may be provided to the biometric application program 102 via the communication module 204 for use in the generation of a biometric template for registration and/or authentication.

The computing device 200 may also include or be otherwise interfaced with a display device 214. The display device 214 may be internal to the computing device 200 or external to the computing device 200 and connected thereto via one or more connections (e.g., wired or wireless) for the transmission of data to and/or from. The display device 214 may be configured to display data to a user of the computing device 200. The display device 214 may be any type of display suitable for displaying data as part of the functions discussed herein, such as a liquid crystal display, light emitting diode display, thin film transistor display, capacitive touch display, cathode ray tube display, light projection display, etc. In some instances, the computing device 200 may include multiple display devices 214. The display device 214 may be configured to, for example, display a prompt to the user requesting the user provide biometric data, such as a request to provide a fingerprint or retinal scan.

The computing device 200 may also include a transmitting device 216. The transmitting device 216 may be configured to transmit data over one or more networks via one or more network protocols. In some instances, the transmitting device 216 may be configured to transmit data to other computing devices and entities via multiple networks, such as the Internet, cellular communication network, local area network, wireless area network, radio frequency, etc. In some embodiments, the transmitting device 216 may be comprised of multiple devices, such as different transmitting devices for transmitting data over different networks, such as a first transmitting device for transmitting data over a local area network and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission. In some cases, each application program stored in the computing device 200 and executed thereby may include transmitting devices similar to the transmitting device 216 for transmitting data to other application programs and modules of the computing device 200 via internal communication methods for performing the functions discussed herein.

Process for Registration of a Biometric Template

Figure 3:
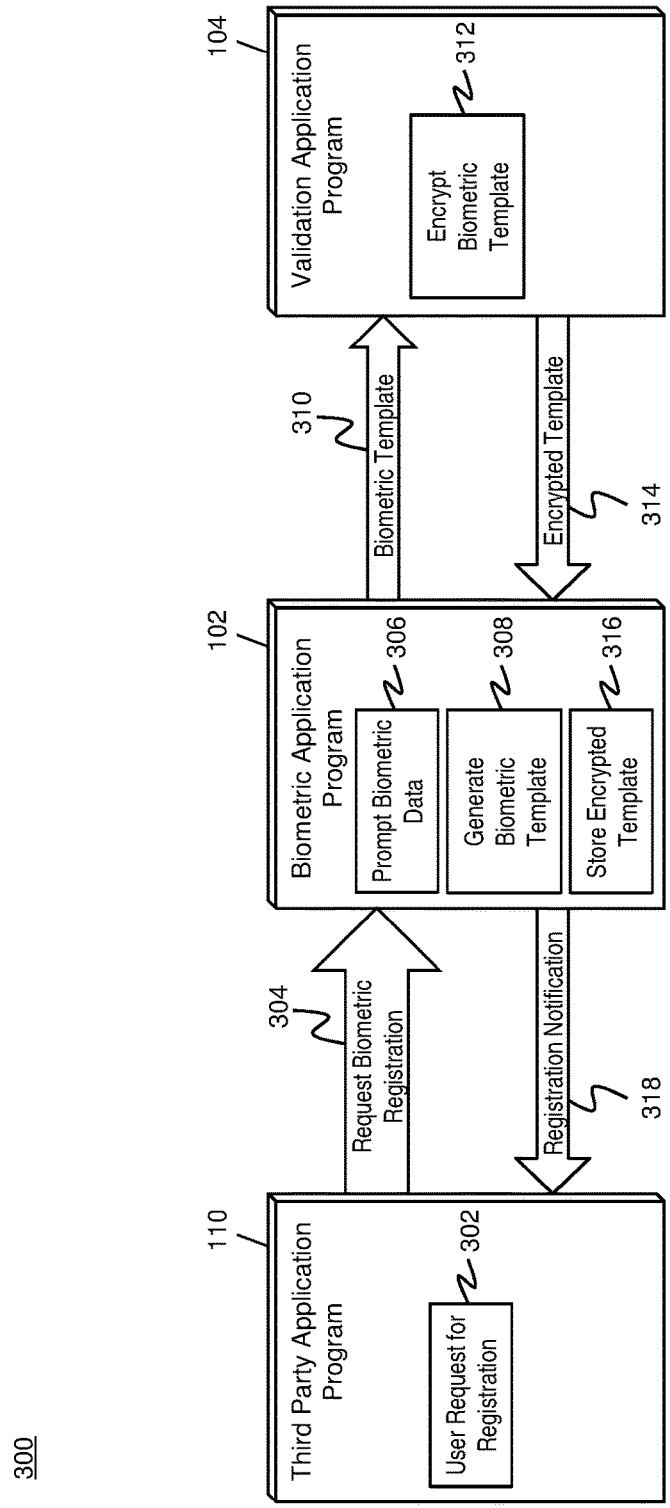
FIG. 3 is a flow diagram illustrating a process for the registration of a biometric template in the computing device of FIG. 2 in accordance with exemplary embodiments.

FIG. 3 illustrates a process for the registration of an encrypted biometric template in the computing device 200 for use in performing biometric authentication locally in the computing device 200.

In step 302, the third party application program 110 may receive a request from the user of the computing device 200 to register for biometric authentication for use with the application program. For instance, the third party application program 110 may be an electronic wallet application program where the user my register for use of biometric authentication for access to payment credentials associated therewith. In step 304, the third party application program 110 may electronically transmit a request for biometric registration to the biometric application program 102 (e.g., via the communication module 204 of the computing device 102). The request for biometric registration may include a unique identifier or other value for associated with the biometric data for use in later authentications. For example, a unique identifier may be used to differentiate between users of the computing device 200, types of biometrics, etc.

The biometric application program 102 may receive the request and, in step 306, may prompt the user to supply biometric data. The prompt may be displayed to the user by the display device 214 or otherwise presented to the user, such as via an audio prompt using an audio emitting device. In some cases, the biometric application program 102 may specify a type of biometric that may be suitably identified based on the capabilities of the computing device 200, such as the biometric input devices 212 thereof. The user may supply their biometric data, which may be received via a suitable biometric input device 212. In step 308, the biometric application program 102 may generate a biometric template using the biometric data. In step 310, the biometric application program may electronically transmit the biometric template to the validation application program 104, stored in the trusted execution environment (TEE) 108.

In step 312, the validation application program 104 may encrypt the biometric template using an encryption key stored in the TEE 108. In some instances, the encryption key may be specifically generated or identified for use with that biometric template. In other instances, a single encryption key may be used by the validation application program 104 for the encryption of biometric templates for use in performing the functions discussed herein. In step 314, the encrypted biometric template may be electronically transmitted to the biometric application program 102 via the communication module 204.

The biometric application program 102 may receive the encrypted biometric template, which then, in step 316, may be stored in the standard storage 208 of the memory 206 of the computing device 200. In some embodiments, the encrypted biometric template may be stored in the TEE 108 in the memory 206. In instances where a unique identifier is included in the request, the encrypted biometric template may be stored with the unique identifier for identification thereof in future authentications. In step 318, the biometric application program 102 may electronically transmit a notification of successful registration to the third party application program 110 via the communication module 204. In some instances, the third party application program 110 may notify the user of the successful authentication, where the user may be able to use the associated functions of the third party application program 110.

Process for Biometric Authentication Using a Registered Biometric Template

Figure 4:
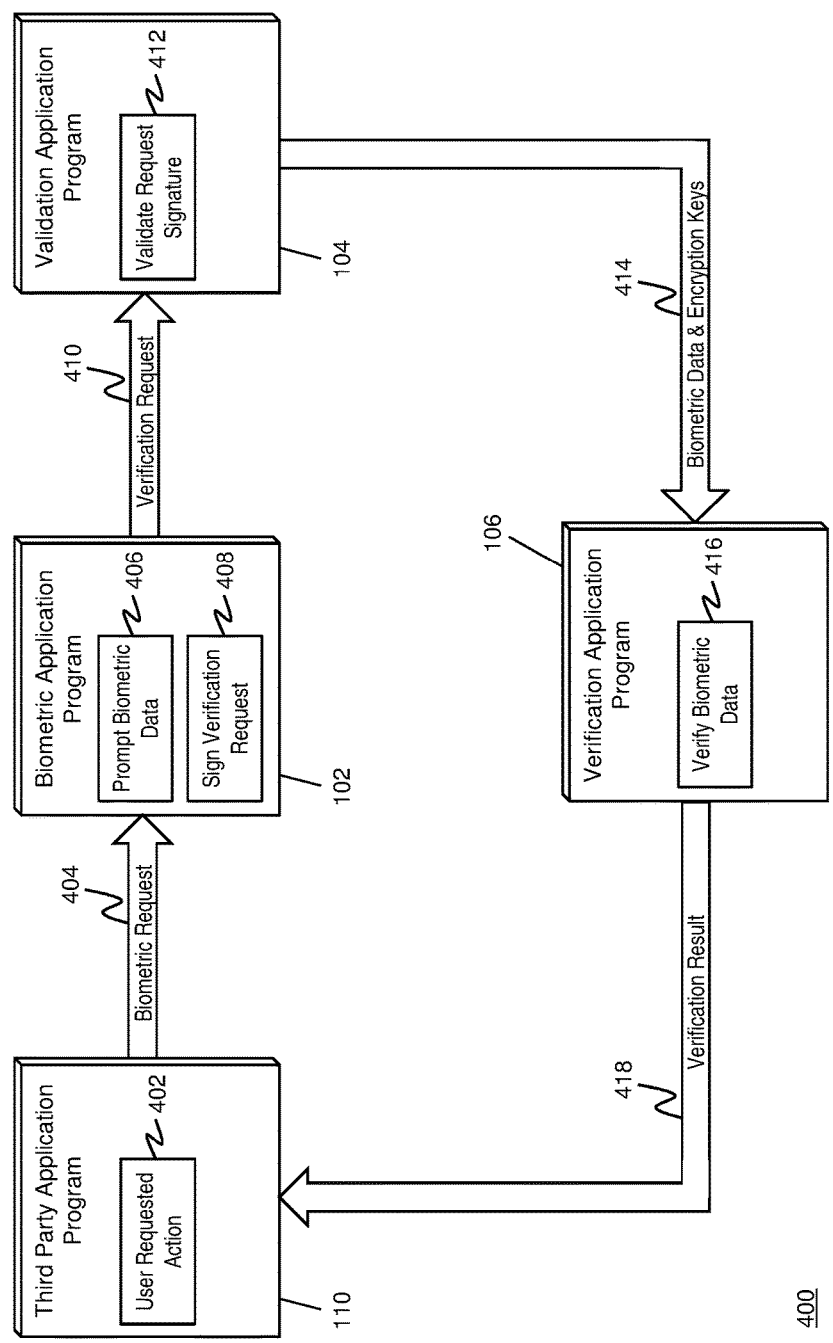
FIG. 4 is a flow diagram illustrating a process for performing device based biometric authentication in the computing device of FIG. 2 in accordance with exemplary embodiments.

FIG. 4 illustrates a process 400 for the performing of biometric authentication locally in the computing device 200 using an encrypted biometric template, such as registered in the computing device 200 using the process 300 illustrated in FIG. 3 and discussed above.

In step 402, the user of the computing device 200 may request the third party application program 110 to perform an action for which biometric authentication is required, where the request may be input using an input device 212 of the computing device 200. For instance, in the above example, the third party application program 110 may be an electronic wallet application program where the user may request use of the payment credentials, for which the electronic wallet application program may require biometric authentication. In step 404, the third party application program 110 may electronically transmit a request to the biometric application program 102 via the communication module 204 requesting biometric authentication. In some instances, the request may include a unique identifier associated with the user.

In step 406, the biometric application program 102 may prompt the user to supply biometric data for authentication. The prompt may be displayed to the user by the display device 214 or otherwise presented to the user, such as via an audio prompt using an audio emitting device. The prompt may be for a specific type of biometric data, such as was provided previously during registration, which may be identified using the unique identifier. In step 408, the biometric application program 102 may generate a biometric template based on the supplied biometric data and generate and sign a verification request, where the request includes the biometric template and, if applicable, the unique identifier. In some instances, the verification request may also include the encrypted biometric template, which may be identified in the standard storage 208 or the TEE 108. The verification request may be digitally signed using an attestation key or other type of private key for which there may be a corresponding public key accessible by the validation application program 104.

In step 410, the biometric application program 102 may electronically transmit the signed verification request to the validation application program 104, stored in the TEE 108. In step 412, the validation application program 104 may validate the digital signature used to sign the verification request. The validation may use the public key that corresponds to the key used to sign the verification request, and may validate the signature using traditional methods and systems related thereto as will be apparent to persons having skill in the relevant art. Upon successful validation of the signature, the validation application program 104 may, in step 414, forward the verification request to the verification application program 106, as well as releasing the encryption key to the verification application program 106. In instances where the verification request from the biometric application program 102 did not include the encrypted biometric template, the validation application program 106 may identify and forward the encrypted biometric template as part of the verification request.

In step 416, the verification application program 106 may verify the biometric data supplied by the user. The verification may include decryption of the encrypted biometric template using the released encryption key and comparison thereof to the biometric template generated by the biometric application program 102 in step 408. The verification may be successful if the supplied biometric template matches the decrypted biometric template that was generated as part of the registration process. The result of the verification may be electronically transmitted, in step 418, to the third party application program 110 by the verification application program 106 via the communication module 204. The third party application program 110 may receive the verification result, which may be used thereby in allowing or preventing the user's requested action based on the result. For instance, in the above example, successful verification may result in the user being provided access to the payment credentials.

Exemplary Method for Registration of a Biometric Template in a Computing Device

Figure 5:
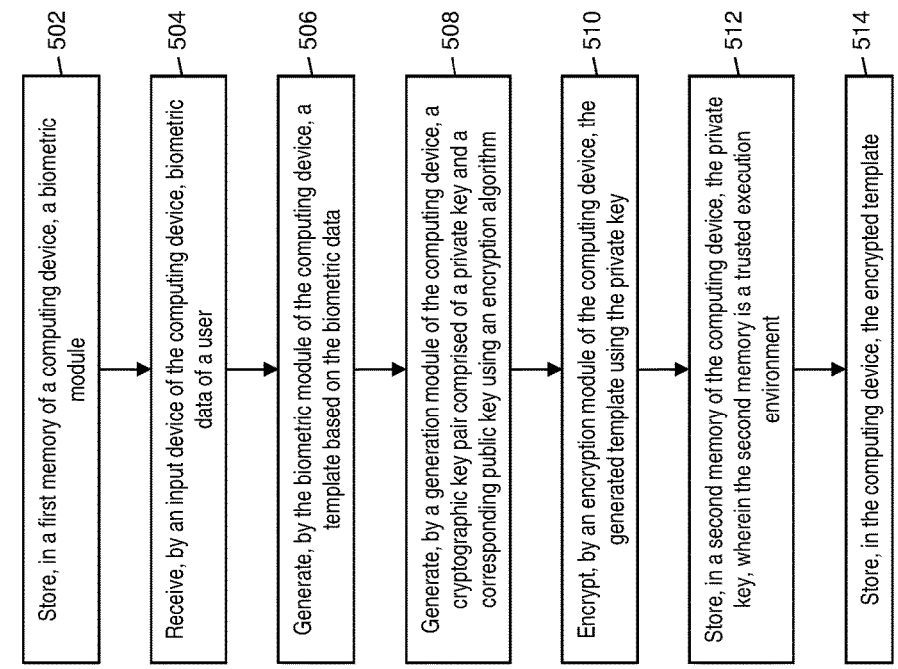
FIG. 5 is a flow chart illustrating an exemplary method for registration of a biometric template in a computing device in accordance with exemplary embodiments.

FIG. 5 illustrates a method 500 for the registration of an encrypted biometric template in a computing device for use in in-device biometric authentication.

In step 502, a biometric module (e.g., the biometric application program 102) may be stored in a first memory (e.g., the standard storage 208) of a computing device (e.g., the computing device 200). In step 504, biometric data of a user may be received by an input device (e.g., the input device 212) of the computing device. In step 506, a template may be generated by the biometric module of the computing device based on the biometric data. In step 508, a cryptographic key pair comprised of a private key and a corresponding public key may be generated by a generation module (e.g., of the validation application program 104) of the computing device using an encryption algorithm.

In step 510, the generated template may be encrypted by an encryption module (e.g., of the validation application program 104) using an encryption algorithm. In step 512, the private key may be stored in a second memory (e.g., the trusted execution environment 210) of the computing device, wherein the second memory is a trusted execution environment. In step 514, the encrypted template may be stored in the computing device.

In one embodiment, the encrypted template may be stored in the second memory of the computing device. In another embodiment, the encrypted template may be stored in the first memory of the computing device. In some embodiments, the encryption algorithm may use the Elliptic Curve Diffie-Hellman protocol. In one embodiment, the encryption module may be stored in the first memory of the computing device. In some embodiments, the first memory and the second memory may be two sections of a single memory (e.g., the memory 206) of the computing device. In one embodiment, the first memory may not be a trusted execution environment.

In some embodiments, the method 500 may further include: storing, in the first memory of the computing device, a first application program (e.g., the biometric application program 102) that comprises at least the biometric module; and storing, in the first memory of the computing device, a second application program (e.g., the validation application program 104) that comprises at least the generation module and the encryption module. In a further embodiment, the first application program may be configured to execute in compliance with specifications of the Fast IDentity Online (FIDO) Alliance. In one embodiment, the biometric data may include at least one of: fingerprint data, retinal scan data, voice data, and facial scan data.

Exemplary Method for Device Based Biometric Authentication

Figure 6:
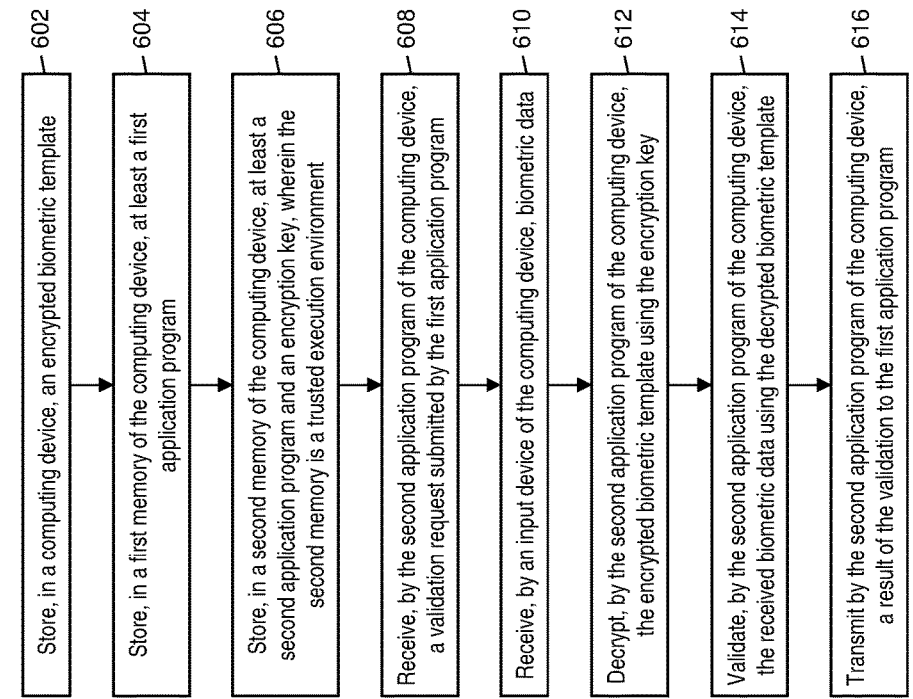
FIG. 6 is a flow chart illustrating an exemplary method for device based authentication in accordance with exemplary embodiments.

FIG. 6 illustrates a method 600 for performing biometric authentication locally in a computing device.

In step 602, an encrypted biometric template may be stored in a computing device (e.g., the computing device 200). In step 604, at least a first application program (e.g., the biometric application program 102) may be stored in a first memory (e.g., the standard storage 208) of the computing device. In step 606, at least a second application program (e.g., the verification application program 106) and an encryption key may be stored in a second memory (e.g., the trusted execution environment 210) of the computing device, wherein the second memory is a trusted execution environment. In step 608, a validation request may be received by the second application program of the computing device that is submitted by the first application program.

In step 610, biometric data may be received by an input device (e.g., the input device 212) of the computing device. In step 612, the encrypted biometric template may be decrypted by the second application program of the computing device using the encryption key. In step 614, the received biometric data may be validated by the second application program of the computing device using the decrypted biometric template. In step 616, a result of the validation may be transmitted by the second application program of the computing device to the first application program.

In one embodiment, the validation request may be digitally signed by the first application program. In a further embodiment, the method 600 may also include verifying, by the second application program of the computing device, the digital signature. In an even further embodiment, the verification may be based on an attestation key stored in the second memory of the computing device. In some embodiments, the method 600 may further include storing, in the second memory of the computing device, a third application program (e.g., the validation application program 104); and releasing, by the third application program of the computing device, the encryption key to the second application program. In a further embodiment, the second application program of the computing device may be unable to access the encryption key prior to the release.

In one embodiment, the encrypted biometric template may be stored in the first memory of the computing device. In another embodiment, the encrypted biometric template may be stored in the second memory of the computing device. In some embodiments, the first memory may not be a trusted execution environment. In one embodiment, the first memory and the second memory may be two sections of a single memory (e.g., the memory 206) of the computing device.

Computer System Architecture

Figure 7:
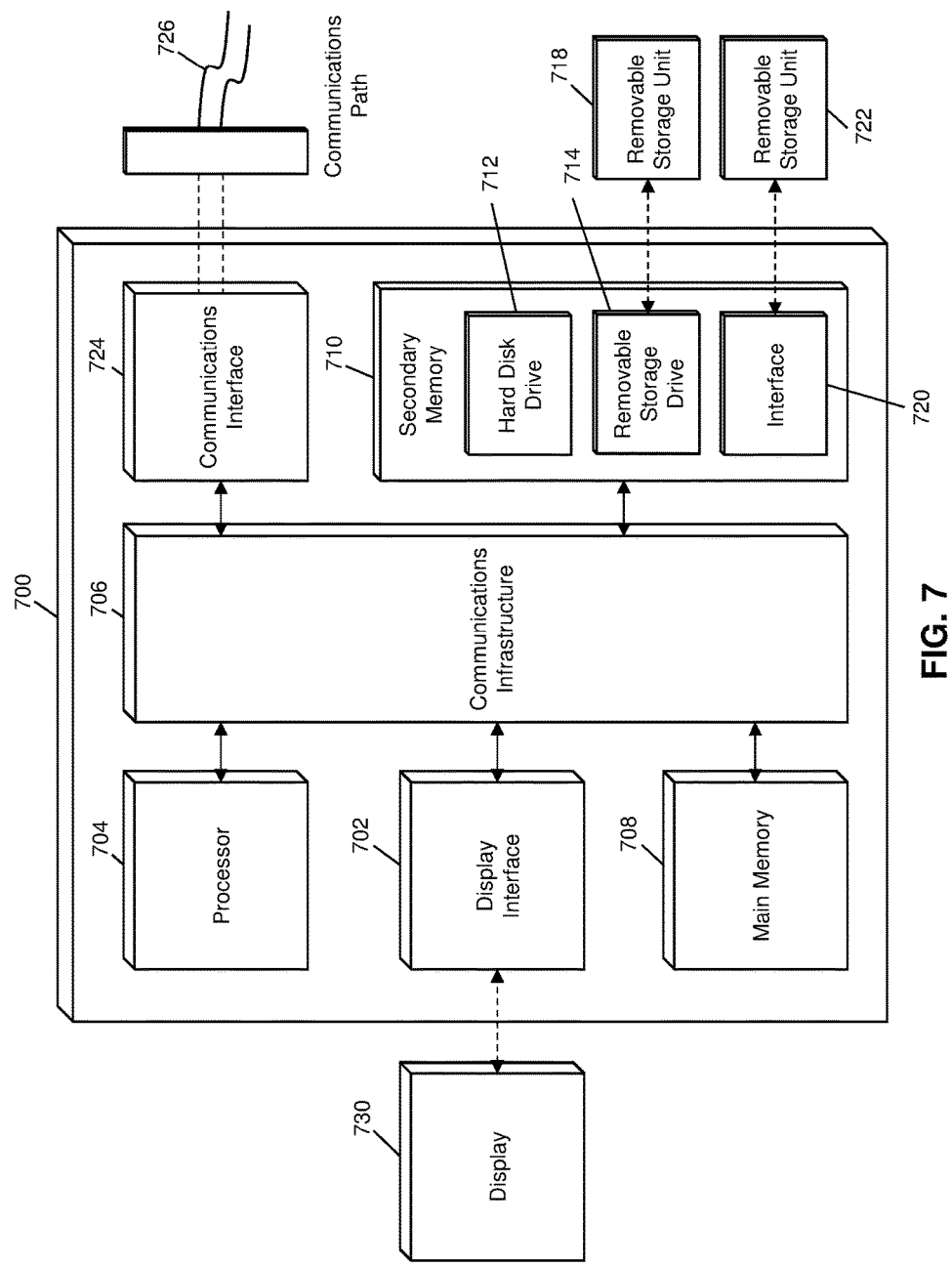
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 200 of FIG. 2 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for registration of biometric templates in computing devices and device based biometric authentication. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for use of a biometric template to perform authentication through biometric data using three distinct application programs and a trusted execution environment in a computing device, comprising:
    storing, in a first memory of a computing device, a biometric application program including a biometric module, a third party application program, and a verification application program, where the biometric application program is in compliance with the Fast IDentity Online (FIDO) alliance;
    receiving, by an input device of the computing device, first biometric data of a user;
    generating, by the biometric module of the computing device, a first template based on the first biometric data;
    generating, by a generation module of the computing device, a cryptographic key pair comprised of a private key and a corresponding public key using an encryption algorithm;
    encrypting, by an encryption module of the computing device, the first template using the public key;
    storing, in a second memory of the computing device, the private key, wherein the second memory is a trusted execution environment;
    storing, in the computing device, the encrypted first template;
    receiving, by the biometric application program, a biometric request submitted by the third party application program;
    receiving, by the input device of the computing device, second biometric data of the user;
    generating, by the biometric module of the computing device, a second template based on the second biometric data;
    receiving, by the verification application program, the second template transmitted by the biometric application program;
    decrypting, by the verification application program, the encrypted first template using the private key stored in the second memory of the computing device;
    verifying, by the verification application program, the second template based on the decrypted first template; and
    receiving, by the third party application program, a result of the verification, wherein
    the biometric application program and the third party application program are prevented from accessing the trusted execution environment or decrypted first template,
    the verification application program is prevented from accessing the first biometric data and the second biometric data, and
    the third party application program receives the result of the verification without receiving the first biometric data, the second biometric data, the second template, or the private key.

2. The method of claim 1, wherein the encrypted template is stored in the second memory of the computing device.

3. The method of claim 1, wherein the encrypted template is stored in the first memory of the computing device.

4. The method of claim 1, wherein the encryption algorithm uses the Elliptic Curve Diffie-Hellman protocol.

5. The method of claim 1, wherein the encryption module is stored in the first memory of the computing device.

6. The method of claim 1, wherein the first memory and second memory are two sections of a single memory in the computing device.

7. The method of claim 1, wherein the first memory is not a trusted execution environment.

8. The method of claim 1, wherein the verification application program comprises at least the generation module and the encryption module.

9. The method of claim 8, wherein the biometric application program is configured to execute in compliance with specifications of the Fast IDentity Online (FIDO) Alliance.

10. The method of claim 1, wherein the biometric data includes at least one of: fingerprint data, retinal scan data, voice data, and facial scan data.

11. A system for use of a biometric template to perform authentication through biometric data using three distinct application programs and a trusted execution environment in a computing device, comprising:
    an input device of a computing device configured to receive first biometric data of a user;
    a first memory of the computing device configured to store a biometric application program including a biometric module configured to generate a first template based on the first biometric data, a third party application program, and a verification application program, where the biometric application program is in compliance with the Fast IDentity Online (FIDO) alliance;
    a generation module of the computing device configured to generate a cryptographic key pair comprised of a private key and a corresponding public key using an encryption algorithm;
    an encryption module of the computing device configured to encrypt the generated first template using the public key, wherein the encrypted template is stored in the computing device; and
    a second memory of the computing device configured to store the private key, wherein the second memory is a trusted execution environment, wherein
    the biometric application program is configured to receive a biometric request submitted by the third party application program;
    the input device of the computing device is further configured to receive a second biometric data of the user;

the verification application program is configured to
receive the second template transmitted by the biometric application program,
decrypt the encrypted first template using the private key stored in the second memory of the computing device, and
verify the second template based on the decrypted first template;

the third party application program is configured to receive a result of the verification;

the biometric application program and the third party application program are prevented from accessing the trusted execution environment or decrypted first template;

the verification application program is prevented from accessing the first biometric data and the second biometric data; and the third party application program receives the result of the verification without receiving the first biometric data, the second biometric data, the second template, or the private key.

12. The system of claim 11, wherein the encrypted template is stored in the second memory of the computing device.

13. The system of claim 11, wherein the encrypted template is stored in the first memory of the computing device.

14. The system of claim 11, wherein the encryption algorithm uses the Elliptic Curve Diffie-Hellman protocol.

15. The system of claim 11, wherein the encryption module is stored in the first memory of the computing device.

16. The system of claim 11, wherein the first memory and second memory are two sections of a single memory in the computing device.

17. The system of claim 11, wherein the first memory is not a trusted execution environment.

18. The system of claim 11, wherein the verification application program comprises at least the generation module and the encryption module.

19. The system of claim 18, wherein the biometric application program is configured to execute in compliance with specifications of the Fast IDentity Online (FIDO) Alliance.

20. The system of claim 11, wherein the biometric data includes at least one of: fingerprint data, retinal scan data, voice data, and facial scan data.

* * * * *